J. H. GUGLER.
BATTERY CONTACT.
APPLICATION FILED FEB. 21, 1908.

938,663.

Patented Nov. 2, 1909.

Witnesses.
A. H. Opsahl.
L. L. Simpson.

Inventor.
J. H. Gugler.
By his Attorneys
Williamson Merchant

UNITED STATES PATENT OFFICE.

JULIUS H. GUGLER, OF MINNEAPOLIS, MINNESOTA, ASSIGNOR TO BATTERY COMPANY, A CORPORATION.

BATTERY-CONTACT.

938,663.  Specification of Letters Patent.  Patented Nov. 2, 1909.

Application filed February 21, 1908. Serial No. 417,020.

*To all whom it may concern:*

Be it known that I, JULIUS H. GUGLER, a citizen of the United States, residing at Minneapolis, in the county of Hennepin and State of Minnesota, have invented certain new and useful Improvements in Battery-Contacts; and I do hereby declare the following to be a full, clear, and exact description of the invention, such as will enable others skilled in the art to which it appertains to make and use the same.

My invention relates to electric batteries and has for its primary object to provide an improved contact for connecting an electrode to a lead thereof.

To the above end, the invention consists of the novel devices and combinations of devices hereinafter described and defined in the claim.

One embodiment of the invention is illustrated in the accompanying drawings wherein like characters indicate like parts throughout the several views.

Figure 2:
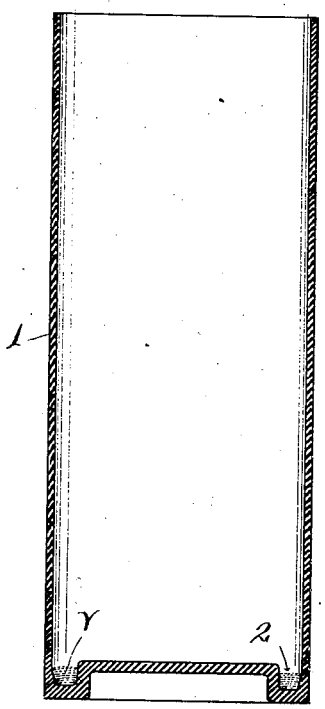
Figure 3:
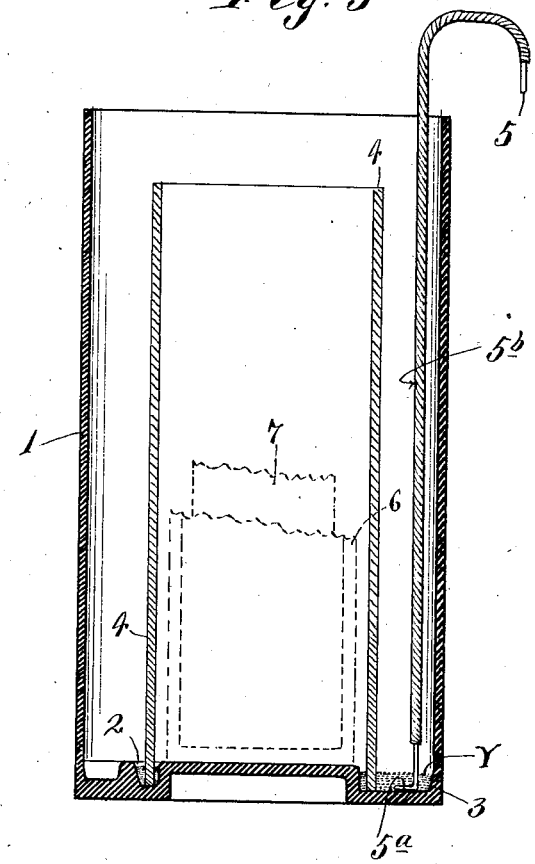
Figure 1:
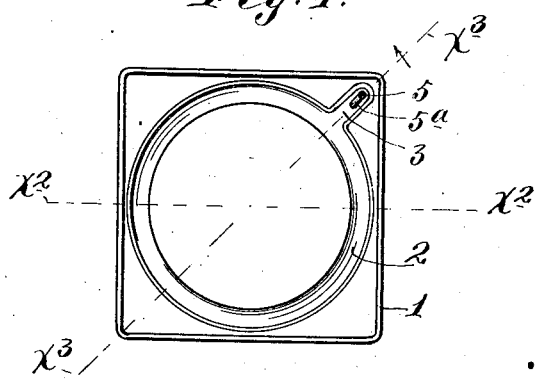

Referring to the drawings; Figure 1 is a plan view showing the body or jar of a primary battery cell. Fig. 2 is a vertical section taken on the line $x^2$ $x^2$ of Fig. 1; and Fig. 3 is a vertical section taken on the line $x^3$ $x^3$ of Fig. 1, and showing also portions of the positive and negative electrodes and certain other elements of the battery.

In the construction illustrated, the outer shell 1 of the cell is rectangular in cross section, and is constructed of vulcanite rubber, glass, or other suitable non-conducting material. In its bottom, the jar 1 is formed with a well, preferably in the form of an annular groove 2, having at one corner of the jar 1 an outwardly extended pocket 3. This well 2 and its pocket 3 contain a body of mercury indicated by the character Y. The positive electrode 4 of the cell is, in this arrangement, cylindrical and is made of zinc or other suitable metal. The lower end of this electrode 4 is immersed in the mercury Y contained within the annular well 2. One of the battery leads 5 is passed downward in one corner of the jar 1, and its lower end is immersed in the mercury contained within the pocket 3 of the well 2. The extreme lower end of said lead 5 is preferably bent laterally, as shown at 5ª, so as to give increased contact surface with the mercury, and the body of said lead is preferably covered with insulation 5ᵇ except at its lower end portion.

The mercury gives a better contact between the lead 5 and electrode 4 than can be obtained by a soldered joint, or clamp or screw contact, and affords the lowest possible resistance between the lead and electrode, and, furthermore, is not subject to corrosion. At the same time, it permits easy separation of the lead from the electrode, or vice versa, and equally easy connection thereof, since it is only necessary to remove the one or the other of the said parts from the mercury, to effect the separation, or to place the said parts in the mercury, to effect the complete electrical connection. In the arrangement described, the mercury will be covered by the battery fluid. In the battery cell illustrated, the negative electrode 7, being of cylindrical form, is adapted to fit within a porous earthen jar 6, which jar in turn is adapted to fit loosely within the cylindrical electrode 4 and to rest on the bottom of the shell or outer jar 1.

In the companion application S. N. 417,021, filed of even date herewith, which has become Patent No. 914038, I have disclosed and claimed a modified form of battery contact employing mercury as the connecting and conducting means between what, for the purposes of illustration, is designated as the negative electrode of the battery and the connecting lead thereof.

In practice, I propose to utilize in a battery cell the construction shown in the drawings of the present application in connection with the construction illustrated in my said companion application, but I do not, of course, limit myself to such combination of parts or to the specific construction illustrated in the said drawings. In a battery of several cells an ordinary rubber covered wire, with band ends, may be used to make connection between cells. The electrode 4 may be reversed end for end so as to insure even consumption of the metal or other material of the said electrode. In fact, this makes it possible to use the said electrode until every ounce thereof has been consumed. The mercury used as the contact amalgamates portions of the lead and electrode connected thereby and thus protects the same from local action in the battery. Furthermore, this mercury or contact fluid reduces to a minimum the resistance and also eliminates variation in resistance which, in other batteries, is frequently due to loose parts. When the mercury contact is located at the bottom of the jar, or is otherwise submerged in the battery fluid, it is protected from oxidation and evaporation, and when it is not thus submerged in the battery fluid, the mercury would preferably be covered by oil, water, or other protecting fluid. The body of mercury used as a contact between the electrode and lead may be variously arranged.

The important feature of this invention consists of extending an insulated wire lead over the top of the said jar, through the solution therein contained and dipping the same loosely into mercury contained at the bottom of the jar. This gives an extremely simple and efficient construction, eliminates the use of a conductor of special construction as part of the lead and permits the lead wire to be removed and again applied without the manipulation of any sort of fastening device. All of that portion of the lead wire 5, except the extreme lower end thereof, should be covered with insulating material to prevent local action on or disintegration of said lead wire under the action of the battery fluid.

What I claim is:—

In a battery, a jar having in its bottom an annular well formed with an outwardly extended pocket containing a body of mercury, in combination with a lead wire extended over the top of the jar, down through the battery fluid and loosely seated at its lower end in the mercury contained in said pocket, the main submerged body portion of said lead wire being covered with insulating material.

In testimony whereof I affix my signature in presence of two witnesses.

JULIUS H. GUGLER.

Witnesses:
H. W. DARBY,
F. D. MERCHANT.